(12) United States Patent
Archbold

(10) Patent No.: US 9,106,700 B2
(45) Date of Patent: Aug. 11, 2015

(54) RISK AWARE DOMAIN NAME SERVICE

(75) Inventor: Richard J. Archbold, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 170 days.

(21) Appl. No.: 13/605,780

(22) Filed: Sep. 6, 2012

(65) Prior Publication Data

US 2014/0068043 A1    Mar. 6, 2014

(51) Int. Cl.
*G06F 15/173*    (2006.01)
*H04L 29/12*    (2006.01)

(52) U.S. Cl.
CPC ......... *H04L 61/1511* (2013.01); *H04L 61/6009* (2013.01)

(58) Field of Classification Search
CPC .................................................... G06F 15/173
USPC ........................................................ 709/223
See application file for complete search history.

(56) References Cited

U.S. PATENT DOCUMENTS

| | | | |
|---|---|---|---|
| 7,523,181 B2 * | 4/2009 | Swildens et al. | 709/223 |
| 7,975,025 B1 * | 7/2011 | Szabo et al. | 709/218 |
| 8,098,686 B1 * | 1/2012 | Krishnamurthy et al. | 370/469 |
| 8,412,832 B2 * | 4/2013 | Narayana et al. | 709/227 |
| 2001/0052016 A1 * | 12/2001 | Skene et al. | 709/226 |
| 2003/0065763 A1 * | 4/2003 | Swildens et al. | 709/224 |
| 2008/0195728 A1 * | 8/2008 | Betarbet et al. | 709/224 |
| 2010/0031078 A1 | 2/2010 | Foote et al. | |
| 2010/0223378 A1 | 9/2010 | Wei | |
| 2010/0223621 A1 * | 9/2010 | Joshi et al. | 718/105 |
| 2011/0276679 A1 | 11/2011 | Newton et al. | |
| 2012/0096051 A1 | 4/2012 | Davis et al. | |
| 2012/0096128 A1 | 4/2012 | Maloo | |
| 2012/0117641 A1 | 5/2012 | Holloway et al. | |
| 2013/0212240 A1 * | 8/2013 | Thornewell et al. | 709/223 |
| 2013/0318602 A1 * | 11/2013 | Devarapalli et al. | 726/22 |
| 2013/0326049 A1 * | 12/2013 | Talton | 709/224 |
| 2014/0019609 A1 * | 1/2014 | Williams et al. | 709/224 |

OTHER PUBLICATIONS

International Search Report and Written Opinion for PCT/US2013/058229 dated Mar. 19, 2014.

\* cited by examiner

*Primary Examiner* — Kostas Katsikis
(74) *Attorney, Agent, or Firm* — Sutherland Asbill & Brennan LLP

(57) ABSTRACT

A risk aware domain name service (DNS), which includes modulating a time to live (TTL) value associated with the DNS based at least in part on one or more DNS-related metrics associated with a DNS server providing DNS resolution is disclosed. A zone file that indicates a particular TTL value may be generated based at least in part on the one or more DNS-related metrics and provided to the DNS server.

20 Claims, 5 Drawing Sheets

RISK AWARE DOMAIN NAME SERVICE

BACKGROUND

When a user device requests a website and/or web service, the user device and any applications running thereon may request a domain address, such as a an internet protocol (IP) address, corresponding to a domain name from one or more entities, such as a domain name server providing domain name service (DNS). The DNS may resolve a domain address, such as a numerical address, from a domain name provided to the domain name server to enable users to use plain text domain name identifiers when using internet services, such as viewing worldwide web (www) pages. To reduce the number of requests to domain name servers, the domain name resolution process may cache or store a domain name and associated domain address for a predetermined period of time. The predetermined period of time is indicated in the DNS response to a user device as a time to live (TTL) value. Therefore the user device may cache a domain name association, such as in memory of the user device for a time corresponding to the TTL value, as incorporated in the DNS response.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
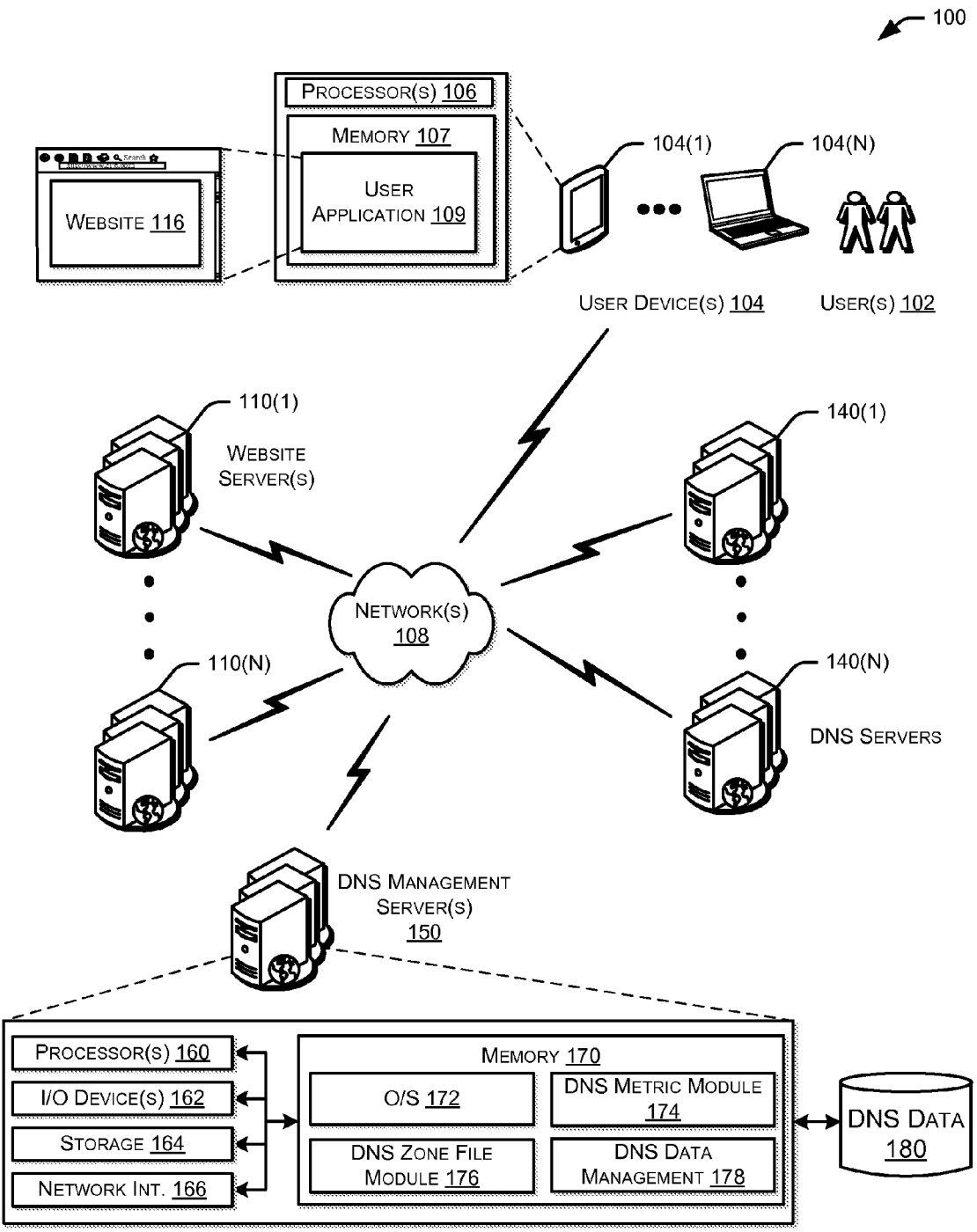
FIG. 1 illustrates an example architecture for providing risk aware domain name service, in accordance with embodiments of the disclosure.

Embodiments of the present disclosure are directed to, among other things, a domain name service (DNS), particularly risk aware DNS.

User devices, such as laptop computers, smart phones, electronic readers, and the like, are often used by users to access websites or web services served by one or more of a variety of website servers. Each of these website servers may have a unique numerical address associated therewith to receive communications via one or more networks to the website servers. In other words, the networks and the elements on the networks, such as routers and hubs, may use numerical addresses associated with website servers to appropriately route communications to the website servers. A user may enter an alphanumeric domain name, such as, for example, www.domain1.com or www.domain2.org, on his/her user device to access a particular website and/or web service. Responsive to receiving the domain name, the user device and/or an application, such as a web browser running thereon, may transmit a DNS request. The DNS request may indicate the domain name entered by the user on the user device and the application running thereon. The DNS request may be in the form of one or more data packet(s) that may further include headers and/or extensions, which may include communications protocol based overhead and/or transmission integrity checks, such as parity bits and/or cyclic redundancy checks (CRCs). The DNS request may be transmitted to a domain name server that may receive the DNS request and generate a DNS response based at least in part on the received DNS request. The DNS response may incorporate therein a domain address associated with the domain name entered by the user on the user device. The DNS response may further incorporate a time to live (TTL) value therein. The TTL may be associated with how long the DNS requesting user device may cache the association between the domain name and the domain address. The DNS response may be in the form of one or more data packet(s) that may further include headers and/or extensions, which may include communications protocol based overhead and/or transmission integrity checks, such as parity bits and/or CRCs. The one or more data packet(s) of the DNS response may be transmitted via one or more networks connecting the DNS servers and the user device.

In one aspect, there may be multiple domain addresses associated with a domain name. For example, a particular website associated with a particular domain name may be served from multiple website servers. In this case, when a user device and an application or operating system running thereon provides a DNS request to a DNS server, the DNS server may provide a DNS response that may direct the user device to be served by any one of the website servers associated with the requested domain name. Furthermore, when the DNS response is generated by the DNS server, there may be a particular TTL associated with that DNS response. When the user device receives the DNS response, the user device may store the DNS name association to DNS address locally on the user device, such as on a local DNS cache that can be accessed by a DNS resolver of the operating system of the user device and/or other applications running on the user device.

The DNS servers may, in some cases, direct the DNS association to expire relatively quickly by providing DNS responses with relatively low TTL values, such as one minute or less. It will be appreciated that in this case, the user device may have to request a DNS resolution relatively frequently when attempting to access a particular website and/or constituent web page(s). Therefore, the DNS server may have the opportunity to relatively frequently direct the user device to one of one or more website servers based on a variety of factors, such as, for example, relative utilization of website servers associated with a particular domain name. In one aspect, by having a relatively short TTL, the user device may be directed to a website server associated with a requested domain name that may be relatively effective in serving the user device at that time. However, in the case of relatively short TTL values, the user device is required to provide a DNS request relatively frequently. If the DNS server becomes slow or unresponsive, then there may be a relatively greater latency and/or failure in the user device resolving the domain name address. In certain embodiments, there may be various types of DNS servers. For example, there may be recursive and/or caching DNS servers and authoritative DNS servers. In these embodiments, the authoritative DNS servers may receive DNS requests from either the user devices or the recursive and/or caching DNS servers.

The DNS servers may receive a zone file that may indicate the TTL value to provide for a particular domain name and/or domain address. In certain embodiments of the disclosure, the DNS servers may receive a time series of zone files that may update the TTLs on a periodic basis, such as hourly. In certain other embodiments of the disclosure, the DNS servers may receive a zone file when one of a domain address and/or a TTL value associated with a particular domain address is to be updated. In yet other embodiments, the DNS servers may receive zone files both on a periodic basis, as well as when one of a domain address and/or a TTL value associated with a particular domain address is to be updated. The zone file may be provided to the DNS servers from one or more DNS management servers. The DNS management servers may generate the zone file based on a variety of metrics associated with the DNS servers, including, for example, DNS server availability. Therefore the DNS management servers may monitor metrics associated with the performance of the one or more DNS servers and based thereon, determine a TTL value to associate with the one or more DNS servers. It will be appreciated that in certain embodiments of the disclosure, the DNS servers may receive an indication of risk aware TTL value(s) from the DNS management servers in a form and/or format other than a zone file.

In certain embodiments, the DNS management servers may detect and/or identify that a particular DNS server metric is indicating that the DNS server is being overtaxed or otherwise indicating the potential of failing to provide a relatively reliable DNS. In this case, the DNS management servers may generate a zone file with a TTL value that is relatively high and/or higher than the previous TTL value associated with that DNS server and the particular domain address. By doing so, the DNS server may provide a greater TTL value in DNS responses, resulting in fewer DNS requests. In other words, if user devices cache a particular domain name and domain address for a longer period of time, then the DNS server may receive a lower frequency of DNS requests. If a DNS server is in a condition where it is receiving a high volume of DNS requests, by increasing the TTL, the volume of DNS requests may be reduced. Therefore, when DNS requests are particularly high, resulting in a greater risk of a DNS server failing to provide DNS, an increase in the TTL may result in a reduced risk in failing to provide DNS by the DNS server.

It will be appreciated that in certain situations, a DNS server may be attacked, such as by malicious entities. Such attacks may constitute transmitting a relatively high volume of DNS requests to overwhelm a particular DNS server and cause the DNS server to be unable to provide DNS. When such an attack is launched, having a high level of DNS requests from user devices, along with malicious attack DNS requests, may further overwhelm the DNS servers. During these times, it may be advantageous to reduce the number and/or frequency of DNS resolutions requested of a DNS server. In embodiments of the disclosure, the DNS resolutions requested from a DNS server may be reduced during times when there is an indication that a particular DNS server is challenged in providing DNS resolution services.

In certain embodiments of the disclosure, the DNS management servers may repeatedly and/or periodically check the performance of one or more DNS servers and, based at least in part on the performance of the DNS servers, may modify the TTL associated with DNS resolution of one or more domain addresses. The performance of the DNS server may be ascertained, for example, by determining the percentage of DNS requests that are resolved within a predetermined period of time and comparing that percentage to a particular threshold. As a non-limiting example, the predetermined period of time may be approximately 1 second and the threshold percentage may be approximately 95%. In other words, for this example, if 95% or fewer DNS requests are observed to not be resolved within 1 second of receiving the DNS request, then the DNS management servers may effectuate a change in the TTL associated with particular domain addresses and/or domain names to increase the general robustness of the DNS infrastructure. Continuing with the example, the DNS management servers may generate one or more zone files associated with one or more domain addresses and associated domain names, where the zone files change a TTL value associated with the domain addresses from a first value to a second value. The first TTL value may be a value that is used when the DNS metrics are indicative of a relatively low risk of DNS failure, and the second TTL value may be a value that may be used when there is an indication of a relatively higher risk of DNS resolution failure. For example, the first TTL value may be 1 minute, and the second TTL value may be 15 minutes. As such, the risk of DNS failure is considered and, based on this consideration, the DNS management server may effectuate a change in the TTL associated with particular domain addresses and/or domain names.

In certain embodiments of the disclosure, the DNS management servers may be configured to identify when a heightened risk of DNS resolution failure is no longer present. A reduced probability of DNS resolution failure may be ascertained by the DNS management servers receiving and considering any variety of metrics associated with a particular DNS server. For example, the DNS management servers may consider the percentage of failed DNS resolutions to DNS requests. As another example, the DNS management servers may consider DNS response latency associated with a particular DNS server. When the DNS management server determines, based on one or more metrics associated with one or more DNS servers, that the risk of DNS failure is relatively low, the DNS management server may initiate a decrease in the TTL associated with a particular domain address and/or domain name. In certain embodiments, the DNS management server may generate a zone file that indicates a reduced TTL thereon and may transmit the zone file to the one or more DNS servers. By doing so, the DNS servers may provide DNS and an associated DNS response with relatively low TTL values. Accordingly, the user device and the DNS resolvers associated with the user devices may cache the DNS associations between a domain name and a domain address for a relatively shorter period of time.

The DNS management servers may also be configured to identify metrics associated with the performance of one or more DNS servers and may be configured to further store the metrics associated with the performance of the one or more DNS servers on a DNS database. This data may be used to track DNS resolution performance of one or more DNS servers or of one or more domain addresses and/or domain names over a period of time. In certain embodiments, the DNS performance data may further be used by the DNS management servers to determine threshold values associated with one or more DNS metrics that indicate when to effectuate a change in the TTL provided by the DNS servers associated with a particular domain address and/or domain name to improve the reliability of the DNS. In other words, the DNS management servers may be configured to evaluate historical data related to DNS performance metrics and any excursions associated with DNS resolution and determine threshold values associated with the metrics that may indicate a relatively high likelihood of DNS resolution failures.

While the discussion herein focuses on the DNS management servers determining a TTL value, such as a risk aware TTL value, it will be appreciated that the methods and functions discussed may be performed by other entities associated with the DNS resolution process, including the DNS servers themselves. Indeed, the DNS TTL control functions may be performed by more than one entity or by the cooperation of two or more entities, such as the DNS management servers and the DNS servers.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative system or architecture 100 in which techniques for providing risk aware domain name service (DNS) is provided. The risk aware DNS may be performed when one or more users 102 interact with at least one user device 104(1)-(N) (collectively, user devices 104) to request access to one or more websites and/or web services provided by one or more website servers 110(1)-(N) (collectively, website servers 110) via network(s) 108. The architecture 100 may also include one or more domain name service (DNS) servers 140(1)-(N) (collectively, DNS servers 140). Further, the architecture 100 may include one or more DNS management servers 150 (referred hereinafter as DNS management servers 150) communicatively coupled to the DNS servers 140 via the networks 108.

The users 102 may be individuals or other entities, such as corporations, non-profit organizations, for-profit organizations, government organizations, public sector organizations, or any of the aforementioned entities located in this country or foreign countries. The user devices 104 may be any one of suitable devices that may be configured to access the website servers 110 via the network 108. The user device 104 may include, but is not limited to, a personal computer, a desktop computer, a notebook computer, a laptop computer, a personal digital assistant, an electronic book (ebook) reader, a tablet computing device, a pad computing device, a smart phone, or combinations thereof. The user devices 104 may include one or more user input interfaces to accept user 102 input. The user devices 104 may further include one or more network interfaces for accessing the network 108. The user devices 104 may yet further include one or more user output interfaces, such as a display, a touch sensitive display, a speaker, a haptic output, or the like. The one or more user output interfaces on the user device 104 may be used by the user 102 to interact with a website 116 and/or web service served by the website servers 110. In other words, the user device 104 may be able to render a website and/or other web service served by the website servers 110. For example, the user devices 104 may be configured to run instructions, such as a user application 109, stored on one or more memories 107 of the user device 104, on one or more processors 106 of the user devices 104 to display one or more websites 116 and/or web services on the display of the user devices 104. In some cases, the user devices 104 may be "intelligent devices" that may execute one or more programs and user applications 109 locally on a processor. In other cases, the user devices 104 may be "dumb terminals" configured to primarily execute software, programs, or user applications 109 related to serving, displaying, or otherwise rendering information or content provided from sources external to the user device 104, such as from the website servers 110. Indeed, the architecture 100 may include both "intelligent devices" and "dumb terminals."

In certain aspects, the websites 116, with constituent web pages and/or web services provided by the website servers 110, may be services that have the website servers 110 provide website 116 contents responsive to the user device 104 and/or applications 109 running thereon requesting the website 116 from the website servers 110. The processors 106 of the user device 104 may run the user application 109 and may attempt to access a website 116 served by a particular website server 110 by identifying an identifier, such as a domain address, such as an internet protocol (IP) address, associated with the particular website server 110. The domain address may be used by the user device 104 to transmit a request for content and properly route the request via the network 108 to the destination website server 110. The request for content may include an indication of an address, such as an IP address associated with the user device 104, so that the website may be able to transmit website 116 content via the network 108 to the user device 104. In certain embodiments, the user device 104 and the processors 106 thereon may be able to acquire the domain address of a website server 110 from which website 116 content is desired by the user 102 of the user device 104 from the DNS servers 140.

In one aspect, the user 102 of the user device 104 may provide the user device and the application, such as a web browser, a domain name. The domain name may be any variety of website identifiers, such as www.domain-1.com or www.domain-2.edu, associated with a particular website 116 content desired by the user 102. Responsive to receiving the domain name, the user application 109 in conjunction with the processors 106 may be configured to identify the domain address, such as an IP address or DNS resource record type, associated with the domain name provided by the user 102. To determine the domain address, the user application 109 may first request the domain address from an operating system running on the processors 106 of the user device 104. The operating system and/or a DNS resolver associated with the operating system may access a local DNS cache of the user device 104, such as a DNS cache stored in memory 107. From the local DNS cache, the processors 106 may attempt to ascertain a domain address, such as an IP address or DNS resource record type, associated with the requested domain name. If the domain address cannot be ascertained from the local DNS cache, then the processors 106 of the user device 104 may be configured to generate and transmit a DNS request message via the network 108 to one of the DNS servers 140, to request the domain address associated with the requested domain name. The processors 106 of the user device 104 may further be configured to receive a DNS response message from the DNS server 140 that contains at least the domain address, such as an IP address or DNS resource record type, associated with the requested domain name. The received DNS response may be in the form of one or more data packets transmitted via the network 108. In certain embodiments, the DNS response may further include a TTL value. The processors 106 of the user device 104 may be configured to extract the domain address and the TTL value from the DNS response. The processors 106 may further be configured to save the domain name to domain address association in the local DNS cache, such as in memory 107 of the user device 104. The user device 104 may use the domain address as received via the DNS response from the DNS server 140 to access the user 102 desired website 116 via the network 108.

The websites 116 and/or web services offered by the website servers 110 may include any variety of suitable websites and/or web services. The websites 116 and/or web services may include, but are not limited to, social networking services and/or accounts, electronic mail (email) services and/or accounts, online retailing and/or purchasing accounts, online media downloading and/or streaming services, online access to financial products, online access to remote control products, or combinations thereof. Some examples of social networking services and/or accounts may include Twitter®, Facebook®, MySpace®, LinkedIn®, Bebo®, Google+®, Orkut®, RenRen®, or the like. Some examples of email services and/or accounts may include Yahoo.com®, Gmail.com®, Hotmail.com®, or the like. Some examples of online retailing and/or purchasing accounts may include accounts at internet domains including Amazon.com®, ebay.com®, Craigslist.com®, Walmart.com® or the like. Some examples of online media downloading and/or streaming services may include services from internet domains including Amazon.com®, itunes.com®, Netflix.com®, Hulu.com®, or the like. Some examples of online access to financial products or services may include secure online access to credit card accounts, banking accounts, bill payment accounts, biller accounts, mortgage accounts, debt accounts, debit card accounts, prepaid card accounts, or the like. Some examples of online access to remote control products may include remote access to home security systems, home appliances, intelligent meters, cellular telephone and/or smart phone accounts, automobiles, or the like. It will further be appreciated that in certain embodiments, the website servers 110 may provide unique access and/or unique content to each of the users 102 that access websites 116 and/or web services served by the website servers 110. To render the unique access and/or unique content to each user 102 of the web pages and/or web services provided by the website servers 110, the website servers 110 may require authentication credentials, such as a login and a password, from a user 102 to uniquely identify the user and access the requested website 116.

The networks 108 may include any one or a combination of different types of suitable communications networks, such as cable networks, the Internet, wireless networks, cellular networks, and other private and/or public networks. Furthermore the networks 108 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. While the illustrated example represents the users 102 accessing a website 116 and/or web service over the networks 108, the described techniques may equally apply to instances where the users 102 interact with the website servers 110 via the one or more user devices 104 over a landline phone, via a kiosk, or in any other manner. It is also noted that the described techniques may apply to other client/server arrangements (e.g., set-top boxes, etc.), as well as in non-client/server arrangements (e.g., locally stored software applications, etc.).

The DNS servers 140 may include one or more processors and one or more memories with programs and/or applications stored thereon. The processors may be configured to execute the programs and/or applications stored on the memory to provide a variety of services, including DNS resolution. The DNS servers 140 may be configured to receive a DNS request from a user device 104 or from another DNS server 140 via the network 108 or other suitable communicative channels. In some cases, an authoritative DNS server 140 may receive a DNS request for DNS resolution form a recursive DNS server. In other cases, the DNS server 140 may receive the DNS request directly from the user device 104. The DNS server 140 may further be configured to extract from the DNS request, a domain name that is requested by a user 102 of the user device 104. The DNS server may further be configured to extract a domain address of the requesting user device 104 from the DNS request. The DNS server 140 may be able to identify a domain address based at least in part on the domain name requested by the user 102 via the user's user device 104. The identification may entail looking up the domain address, such as an IP address or DNS resource record type, from a look-up table containing associations of various IP addresses with various domain names. The look-up table may be stored in the memory of the DNS server 140 or any other suitable location, such as a remote database or a remote server.

The DNS server 140 may further be configured to generate a DNS response based at least in part on the identified domain address associated with the requested domain name as requested by the user 102 on the user device 104. The DNS response may include one or more of a domain address, such as an IP address or DNS resource record type, and an associated TTL value. The domain address and the TTL value may be identified from a look-up table or other association between domain names and domain addresses. The DNS response may be in the form of one or more data packets that may be transmitted via the network 108 from the DNS servers 140 to the user device 104.

In certain embodiments, the domain addresses and/or the TTL values associated with a particular domain name may be specified in a zone file provided to the DNS server 140. In certain embodiments, the zone file may be provided to the DNS server 140 by the DNS management servers 150. The zone file may be in the form of one or more data packets that may be received via the network 108 by the DNS servers 140. Therefore, the DNS servers 140 may be configured to receive one or more zone files via the network 108 and to extract domain name to domain address associations and TTL values therefrom. The identification of the associations and the TTL values may entail parsing the one or more data packets that comprise the zone file. In certain cases, the DNS servers 140 may receive new zone files periodically, such as every 5 minutes. In other cases, the DNS servers 140 may receive zone files in an asynchronous manner, such as when one of either or both the domain name to domain address association or the TTL values are to be updated for a particular DNS server 140 and/or a particular domain name. In certain other embodiments, the DNS servers 140 and the one or more processors thereon may be configured to provide risk aware TTL values for DNS responses. Indeed, the functions and processes that may be executed by the DNS management servers 150 to determine risk aware TTL values may be performed, in certain embodiments, at the DNS servers 140.

In one illustrative configuration, the DNS management servers 150 may include one or more processors 160, one or more input/output (I/O) device(s) 162, one or more storage drivers 164, one or more network interfaces(s) 166, and a memory 170. The I/O device(s) or user interface(s) 162 may include any suitable I/O device, such as a keyboard, a mouse, a pen, a voice input device, a touch input device, a display, speakers, a printer, etc. The one or more storage device drivers 164 may enable communications with one or more external storage devices and/or databases, such as a DNS database 180, as illustrated. The network interfaces(s) 166 allow communication with stored databases, other computing devices or servers, user terminals, and/or other devices on the networks 108.

The memory 170 may store program instructions that are loadable and executable on the processor(s) 160, as well as data generated or received during the execution of these programs. Depending on the configuration and type of DNS management servers 150, the memory 170 may be volatile (such as random access memory (RAM)) and/or non-volatile (such as read-only memory (ROM), flash memory, etc.).

Turning to the contents of the memory 170 in more detail, the memory 170 may include an operating system 172, a DNS metric module 174, a DNS zone file module 176, and/or a DNS data management module 178. Each of the modules and/or software may provide functionality for the DNS management servers 150, when executed by the processors 160. The modules and/or the software may or may not correspond to physical locations and/or addresses in the memory 170. In other words, the contents of each of the modules may not be segregated from each other and may, in fact, be stored in at least partially interleaved positions on the memory 170.

The operating system 172 may have one or more operating systems stored thereon. The processors 160 may be configured to access and execute one or more operating systems stored in the operating system 172 to operate the system functions of the DNS management servers 150. System functions, as managed by the operating system 172 may include memory management, processor resource management, driver management, application software management, system configuration, and the like. The operating system 172 may be any variety of suitable operating systems including, but not limited to, Microsoft® Windows®, Microsoft® Windows® Server®, Linux, Apple® OS-X®, or the like.

The DNS metric module 174 may have stored thereon instructions and/or programs, that when executed by the processors 160, may enable the DNS management servers 150 to assess metrics associated with the DNS servers 140. The DNS management servers 150 may poll metrics from the DNS servers 140 and/or passively receive the metrics. In certain embodiments, the DNS management servers 150 and the processors 160 thereon may repeatedly send DNS requests to the DNS servers 140 to determine the percentage of DNS requests that are being resolved and those that are failing. A greater percentage of failure of DNS resolution may indicate heavy loading of the DNS servers 140 and/or possibly a signature of malicious activity, such as a denial of service attack. In the same or other embodiments, the DNS management servers 150 may also identify the latency associated with the resolution of a DNS request. In this case, a relatively longer latency in DNS resolution may indicate a relatively greater loading of the DNS servers 140 or a possibility of malicious activity. The DNS metric module 174, therefore, may contain instructions that may be executed by the processors 160 to send one or more DNS requests to the DNS servers 140 and measure metrics associated with resulting resolutions. Alternatively, the DNS management servers 150 may retrieve and/or receive DNS resolution based metrics from the DNS servers 140. In other words, the DNS servers 140 may maintain metrics associated with DNS resolution provided by that DNS server 140 locally on the DNS server 140. The DNS management servers 150 may be configured to receive those metrics from the DNS servers 140 periodically or based on requesting those metrics.

The DNS zone file module 176 may have stored thereon instructions and/or programs; that when executed by the processors 160, may enable the DNS management servers 150 to generate and/or transmit a zone file. The zone file may be in the form of one or more data packets that may be transmitted via the network 108. The zone file may be transmitted by the DNS management servers 150 to each of the individual DNS servers 140(1)-(N). In certain embodiments, the DNS management servers 150 may generate the zone file based on availability of particular website servers 110. In the same or further embodiments, the DNS management servers 150 may generate the zone file based at least in part on DNS metrics associated with one or more of the DNS servers 140. Furthermore, the zone files generated by the processors 160 executing instructions in the DNS zone file module 176 may associate a particular domain name with a particular domain address, such as an IP address or DNS resource record type. The zone file may further specify a TTL value associated with the domain name to domain address association.

In certain embodiments, the instructions and/or programming stored in the DNS zone file module 176, when executed by the processors 160, may enable the DNS management servers 150 to determine an appropriate domain name to domain address association. In certain cases, a particular domain name and associated website content may be served by a single website server 110 and, therefore, the domain name to domain address association may be fixed or unchanged over time. However, in other cases, a particular domain name and associated website content may be served by more than one website server 110, where each website server 110 may have a unique domain address, such as an IP address or DNS resource record type, associated therewith. In this case, the zone file may direct the DNS servers 140 to direct a user device 104 to a particular website server 110 associated with a particular domain name and website. The determination of the particular website server 110 may be based at least in part on which of the website servers 110 are most available for serving the websites associated with the requested domain name. In other words, if one of the website servers 110 associated with the requested website shows indications of instability or indications of failure to serve the associated requested websites, the zone files generated by the processors 160 may include a website server 110 other than the unstable website server 110.

The zone file may also be based at least in part on the metrics associated with the one or more DNS servers 140. The processors 160, based on instructions stored in the DNS zone file module 176, may be able to determine if there is a relatively high risk of DNS failure. If it is determined by the processors 160 that there is a relatively high risk of DNS failure, the processors 160 may be configured to generate a zone file with a relatively high TTL value, such as about 15 minutes or more. On the other hand, if the processors 160 determine that there is a relatively low risk of DNS failure, then the processors 160 may be configured to generate a zone file with a relatively low TTL value, such as about 1 minute.

The processors 160, by executing instructions and/or programs stored in the DNS data management module 178 may be configured to receive DNS related metrics and store and/or manage those metrics in memory 170 and/or the DNS database 180. In other words, the processors 160 may be configured to receive the DNS metric data, such as DNS failure percentage or DNS latency, associated with one or more DNS servers 140 and may organize and store the DNS metrics to the memory 170 and/or the DNS database 180.

The DNS data management module 178 may further contain instructions and/or programs that enable the processors 160 of the DNS management servers 150 to consider historical DNS metric data to determine threshold levels associated with those DNS metrics. In other words, the processors 160 may be configured to compare historical DNS data as stored in the DNS database 180 to establish and/or modify threshold values at which TTL values should be changed via generation of new zone files. For example, if the processors 160, based on an analysis of historical DNS metric data determine that a particular level of a particular DNS metric indicates a relatively high probability of DNS resolution failure, then the processors 160 may set that particular level as a threshold level for determining that TTL values should be modified. Indeed, the processors 160 of the DNS management servers 150 may be configured to determine and continuously monitor threshold values associated with a variety of DNS metrics and/or a variety of DNS servers 140.

The processors 160, while executing the instructions and/or programs stored in the DNS data management module 178, may be further configured to receive and/or analyze indications of DNS resolution failures associated with one or more DNS servers 140. In some cases, the processors 160 may receive indications of severe DNS failure, such as if a DNS server 140 becomes inoperative or fails to resolve DNS requests above a predetermined threshold percentage. The processors 160 may then be able to consider the DNS failure information and use that information to analyze DNS metric data leading up to a failure event to ascertain metric data that may indicate an impending and/or a likely DNS failure. In certain embodiments, the DNS metric thresholds associated with identifying a relatively high probability of DNS failure may be continuously and/or periodically updated. These threshold values may be considered by the instructions and/or programs stored in the DNS zone file module 176 to determine what TTL values to supply in zone files supplied to the DNS servers 140.

It will be appreciated that there may be overlap in the functionality of the instructions stored in the DNS metric module 174, the DNS zone file module 176, and the DNS data management module 178. In fact, the functions of the three aforementioned modules 174, 176, 178 may interact and cooperate seamlessly under the framework of the DNS management servers 150. Indeed, each of the functions described for any of the modules 174, 176, 178 may be stored in any module 174, 176, 178 in accordance with certain embodiments of the disclosure. Further, in certain embodiments, there may be one single module that includes the instructions, programs, and/or applications described within the DNS metric module 174, the DNS zone file module 176, and the DNS data management module 178.

The DNS database 180 may include removable storage and/or non-removable storage. The DNS database 180 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 170 may include multiple different types of memory, such as static random access memory (SRAM), dynamic random access memory (DRAM), and/or ROM.

The memory 170 and/or the DNS database 180, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

The website servers 110 may be accessed by a user 102 via a respective corresponding user device 104 to request website 116 content. The user 102 may provide a domain name on the user device 104 with which the website 116 may be associated. The user device 104 may next resolve a domain address, such as IP address or DNS resource record type, associated with the domain name to communicate with the appropriate website server 110 via the network 108. The process of resolving the network address may involve the user device 104 communicating with a DNS server 140 to ascertain the domain address. The user device 104 may provide a DNS request to the DNS servers 140. The DNS request may include the domain name for which a domain address is desired. The DNS request may further include the IP address of the user device 104 or of a requesting recursive DNS server, which may be used by the DNS server 140 to communicate a DNS response back to the user device 104 or recursive DNS server. The DNS response may include a resolution of the domain address, such as an IP address or DNS resource record type, as well as a TTL value that indicates how long the user device 104 may cache or save the association between the domain name and the domain address locally on the user device 104. Embodiments of the disclosure provide for the DNS servers 140 to provide a TTL value in the DNS response to the user device 104 that may be based at least in part on risk associated with DNS failure and/or metrics associated with DNS resolution. In the same or additional embodiments, the TTL values may be increased for a DNS server 140 when there is an indication of elevated risk of DNS failure from that DNS server 140.

Figure 2:
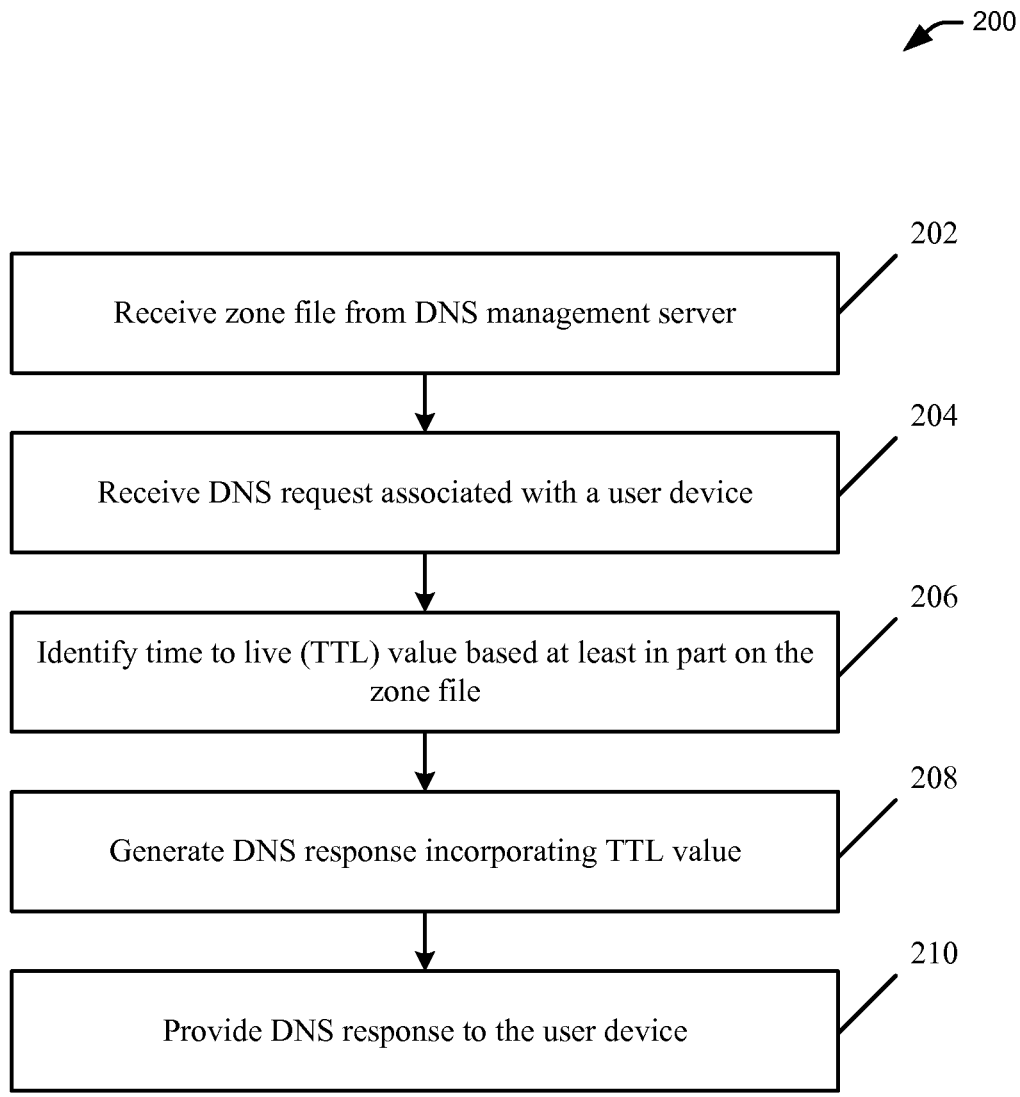
FIG. 2 illustrates a flow diagram representing an example method for providing risk aware domain name service responses, in accordance with embodiments of the disclosure.

Referring now to FIG. 2, an example method 200 for providing a risk aware DNS response to a user device 104 is illustrated. The method 200 may be implemented by the DNS servers 140. At block 202, a zone file may be received. The zone file may include one or more associations between domain names and domain addresses, such as IP addresses. The zone file may further include one or more TTL values that indicate how long the associations between the domain names and the domain addresses should be cached on a user device 104. The DNS server 140 may store the information received via the zone file. For example, the DNS server 140 may update a look-up table that provides domain name to domain address information, as well as associated TTL information based at least in part on the received zone file.

The zone file may be received from the DNS management servers 150. In one aspect, instructions and/or programs stored in the memory 170 of the DNS management servers 150 may be executed by the processors 160 of the DNS management servers 150 to generate the zone file. The zone file may be generated by the DNS management servers 150 based at least in part on metrics associated with the one or more DNS servers 140. In certain embodiments, the zone file associated with a particular DNS server 140(1)-(N) may be based on DNS metrics associated with that particular server. The received zone file may be in the form of one or more data packets configured to be transmitted via the networks 108. The one or more data packets may include header information, such as routing information, transmission protocol information, destination information, or the like. The one or more data packets may further include extension information, such as parity check bit(s), CRC bit(s), or other transmission quality check information.

It will be appreciated that at block 202, the DNS server 140 may receive multiple zone files. In certain embodiments, the DNS server 140 may store and use the latest zone file. In other words, whenever a new zone file is received by the DNS server 140, the information contained therein may be used to update and/or replace pre-existing information associated with domain name associations and/or TTL values. Therefore, the DNS servers 140 may have a look-up table of domain name to domain address associations along with TTL values that may be updated based at least in part on the most recently received zone file.

At block 204, a DNS request associated with a user device may be received. In certain embodiments, the DNS request may be received from a particular user device 104 or from another DNS server 140. For example, an authoritative DNS server may receive a DNS request form a recursive DNS server. The DNS request may include a domain name or an indication thereof. This domain name may be the domain name that is requested by the user 102 on his/her user device 104. For example, the user 102 may have provided the domain name to the user application 109, such as a web browser, running on the user device 104. Based on the domain name provided by the user 102 on the user device 104, the user device 104 and associated processors 106 may attempt to resolve a domain address locally. This attempt may be by accessing a local DNS cache stored in the memory 107 of the user device 104. If the user device 104 fails to resolve the DNS locally, then the user device 104 may generate the DNS request and transmit the DNS request to the DNS server 140 via the network 108. In this case, the DNS request may be transmitted to either an authoritative DNS server or a recursive DNS server. If the DNS request from the user device 104 is sent to a recursive DNS server, but cannot be resolved by the recursive DNS server, then the recursive DNS server may subsequently provide a related DNS request to an authoritative DNS server. In addition to the domain name, the DNS request may further include the network address, such as an IP address, of the requesting user device 104. This address may be incorporated in the DNS request so that the DNS server 140 is ultimately able to communicate back to the user device 104 using the provided user device address. The received DNS request may be in the form of one or more data packets configured to be transmitted via the networks 108. The one or more data packets may include header information, such as routing information, transmission protocol information, destination information, or the like. The one or more data packets may further include extension information, such as parity check bit(s), CRC bit(s), or other transmission quality check information.

At block 206, the TTL value associated with the domain name for which DNS resolution is requested may be determined based at least in part on the received zone file. In one aspect, the determination may be made by using a look-up table stored in the memory of the DNS server 140 that is updated based at least in part on the received zone file. The TTL values may be extracted from the zone file by any variety of mechanisms including, for example, parsing the one or more data packets of the zone file to extract the relevant information.

At block 208, a DNS response incorporating the TTL value may be generated. The generated response may have a domain address, such as an IP address or DNS resource record type, that is associated with the domain name from the DNS request. The DNS response may further include a TTL value to direct the user device 104 on how long to cache or store the domain name to domain address association. The generated DNS response may be in the form of one or more data packets configured to be transmitted via the networks 108. The one or more data packets may include header information, such as routing information, transmission protocol information, destination information, or the like. The one or more data packets may further include extension information, such as parity check bit(s), CRC bit(s), or other transmission quality check information. In this case, the routing information may include the network address, such as the IP address, associated with the user device 104 from which the DNS request was received at block 202. At block 210, the generated DNS response may be transmitted to the user device 104. The transmission may be via the network 108 using the user device address that may have been transmitted as part of the DNS request from the user device 104.

It should be noted that the method 200 may be modified in various ways in accordance with certain embodiments of the disclosure. For example, one or more operations of the method 200 may be eliminated or executed out of order in other embodiments of the disclosure. Additionally, other operations may be added to the method 200 in accordance with other embodiments of the disclosure. In particular, any of the processes of blocks 202, 204, and 206 may be executed in any appropriate order. For example, the zone file, in certain embodiments, may be received after receiving the DNS request.

Figure 3:
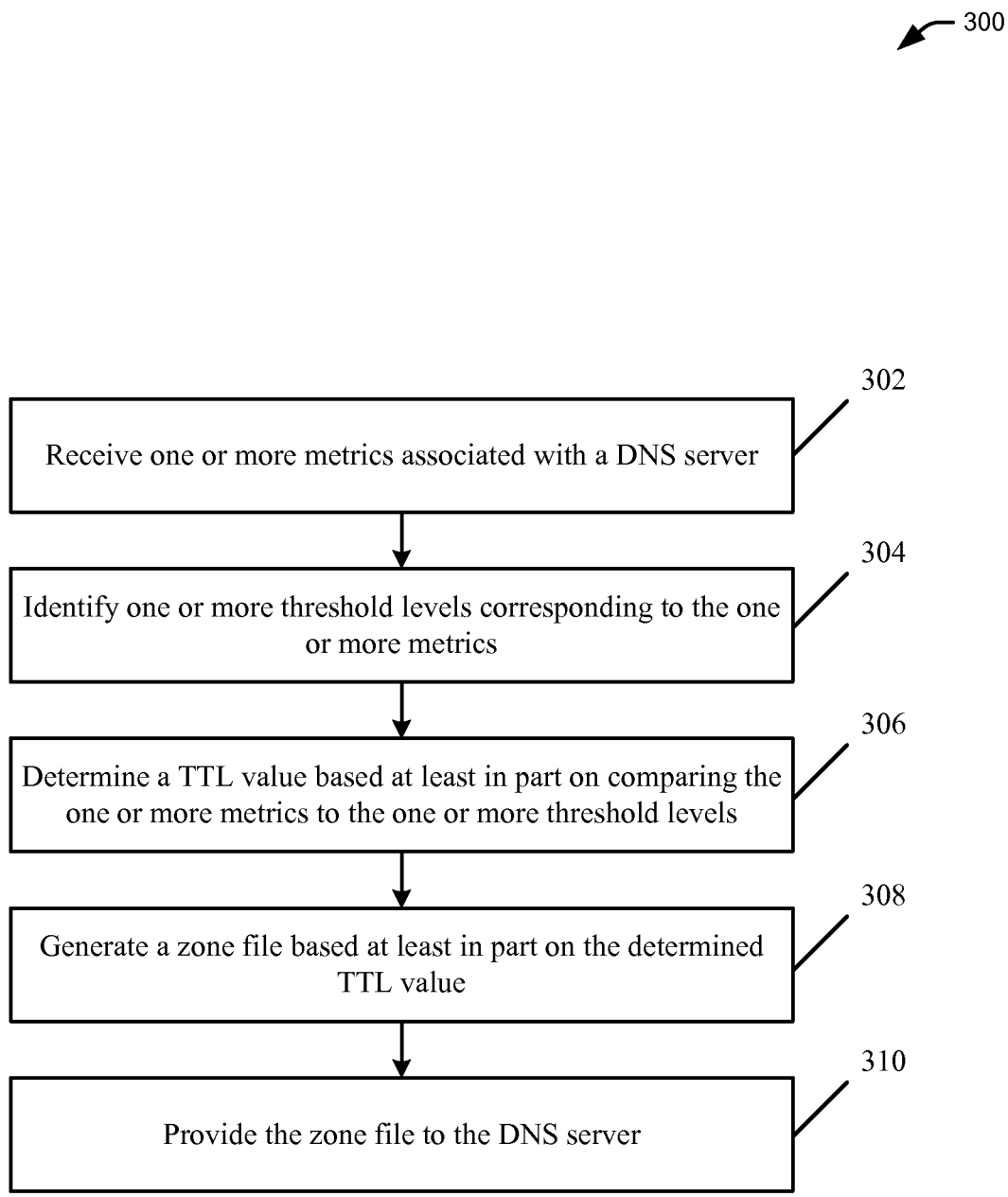
FIG. 3 illustrates another flow diagram representing an example method for generating and transmitting a zone file for controlling risk aware domain name service, in accordance with embodiments of the disclosure.

Referring now to FIG. 3, an example method 300 of providing the zone file to the DNS server is illustrated. The method 300 may be performed by the DNS management servers 150 and/or the processors 160 and software associated therewith. In certain other embodiments, the method 300 may be performed by the DNS servers 140. At block 302, one or more metrics associated with a DNS server may be received. These metrics may be any variety of metrics including, but not limited to, DNS server availability, DNS server resolution percentage, DNS request frequency, DNS server processor usage, and/or DNS resolution latency. It will be appreciated that there may be any variety of DNS metrics that may be received by the DNS management servers 150, either directly from the DNS server 140 or from another entity.

In certain embodiments, the DNS server 140 may track metrics associated with the DNS resolution that it provides. For example, the DNS server 140 may track DNS server availability. The tracking may be a time series of data where each data point may indicate an availability of the DNS server 140 at a particular point in time. The DNS server 140 may in certain cases store the DNS-related metrics in memory locally on the DNS server 140. In certain embodiments, the DNS server 140 may periodically transmit DNS metrics to the DNS management servers 150. In certain other embodiments, the DNS server 140 may transmit DNS metrics data to the DNS management servers 150 only when the DNS management servers 150 poll the DNS servers 140 for the data.

In certain embodiments, the DNS management server 150 may collect the DNS metrics associated with a particular DNS server 140. For example, the collection may involve the DNS management servers 150 periodically transmitting a DNS request to the DNS servers 140. The DNS management servers 150 may receive one or more DNS responses to the one or more DNS requests and may determine from those DNS responses any variety of DNS metrics associated with a particular DNS server 140. For example, the DNS management servers 150 may be able to ascertain DNS availability, DNS latency, and/or DNS resolution failure from the received DNS responses. It will be appreciated that the DNS management servers 150 may be able to tally how many DNS requests have not been resolved from a collection of DNS requests and from that data determine DNS resolution failure levels and/or percentages. Additionally, the DNS management servers 150 may measure the amount of time between sending a DNS request and receiving a DNS response and may determine DNS latency therefrom.

At block 304, the DNS management servers 150 may identify one or more threshold levels corresponding to the one or more metrics. These threshold levels may be predetermined and fixed in certain embodiments. In other embodiments, the threshold levels corresponding to the one or more metrics may be dynamically and/or periodically determined by the DNS management servers 150. In yet other embodiments, the threshold levels may be provided to the DNS management servers 150 from one or more other entities, for example, via the network 108. Regardless of the source of the threshold levels corresponding to the one or more metrics, the DNS management servers 150 may be able to identify the metric to which the threshold levels correspond in any variety of ways, including the use of unique identifiers associated with the threshold values. In some cases, there may be a single threshold value associated with a particular metric for a particular DNS server 140. For example, a threshold value of 95% may be associated with a DNS server availability metric. In other cases, there may be more than one threshold value associated with a particular metric associated with a particular DNS server 140. For example, threshold values of 75% and 95% may be associated with a DNS server availability metric.

At block 306, a TTL value may be determined based at least in part on comparing the one or more metrics to the one or more threshold levels. In other words, the TTL value may depend on a value of a DNS metric in relation to one or more threshold values associated with that metric. As a non-limiting example, consider that there are two threshold levels associated with DNS latency. If a latency value is received at block 302 and the two threshold values are identified at block 304, then at block 306 the DNS management servers 150 may be able to determine a TTL value. The DNS management servers 150 may determine a first TTL value, if the latency value is less than both of the threshold values. The DNS management servers 150 may determine a second TTL value, if the latency value is between the two threshold values, and the DNS management servers 150 may determine a third TTL value, if the latency value is greater than both of the threshold values. It will be appreciated that if the latency value is low, then there is a reduced risk of DNS resolution failure. Accordingly, in the case of the example and in certain embodiments, the first TTL value may be less than the second TTL value, and the third TTL value may be greater than the second TTL value. Non-limiting examples of first, second, and third TTL values may be about 1 minute, 15 minutes, and 30 minutes.

It will be appreciated that in certain cases the TTL value may be determined based on more than one type of metric and associated threshold values. For example, the TTL values may be determined based on both DNS latency metrics and DNS failure levels associated with a particular DNS server 140. In certain embodiments, the TTL value selected may be the TTL value corresponding to the highest TTL value determined from any of the DNS metrics available. In other embodiments, the TTL values may be determined in a variety of other ways, such as selecting the lowest TTL value as determined from any of the DNS metrics considered or taking an average of TTL values determined from each of the DNS metrics considered.

At block 308, a zone file may be generated based at least in part on the determined TTL value. As discussed above, the zone file may include at least one association of a domain name to a domain address, such as an IP address or DNS resource record type. The zone file may further include the TTL values as determined in block 306. The zone file may be in the form of one or more data packets that may be configured to be parsed by the receiving DNS server 140 to extract information, such as the TTL values. At block 310, the generated zone file may be provided to the DNS server 140. In one aspect, the zone file may be transmitted via the network 108 from the DNS management servers 150 to the DNS server 140. It will be appreciated that the zone file may be provided to the DNS server 140 at a predetermined time and/or frequency. Alternatively, the zone file may be provided to the DNS server 140 when the DNS management server 150 detects a change in a metric over a corresponding threshold value. In this case, the DNS management server 150 may provide a change in the TTL value at the DNS server 140 at an unscheduled time in response to a change in the risk assessment associated with DNS resolution for the particular DNS server 140.

It will be appreciated that in certain embodiments, the risk aware TTL values may be communicated without incorporation in a zone file. Indeed, in these embodiments, the DNS management server 150 may provide the DNS servers 140 with an indication of the TTL value that should be used for particular DNS resolution processes. In yet other embodiments, where the aforementioned processes are conducted at the DNS server 140 rather than at the DNS management servers 150, the TTL values may be updated at the DNS servers 140 without the generation of zone files.

It should be noted that the method 300 may be modified in various ways in accordance with certain embodiments of the disclosure. For example, one or more operations of the method 300 may be eliminated or executed out of order in other embodiments of the disclosure. Additionally, other operations may be added to the method 300 in accordance with other embodiments of the disclosure.

Figure 4:
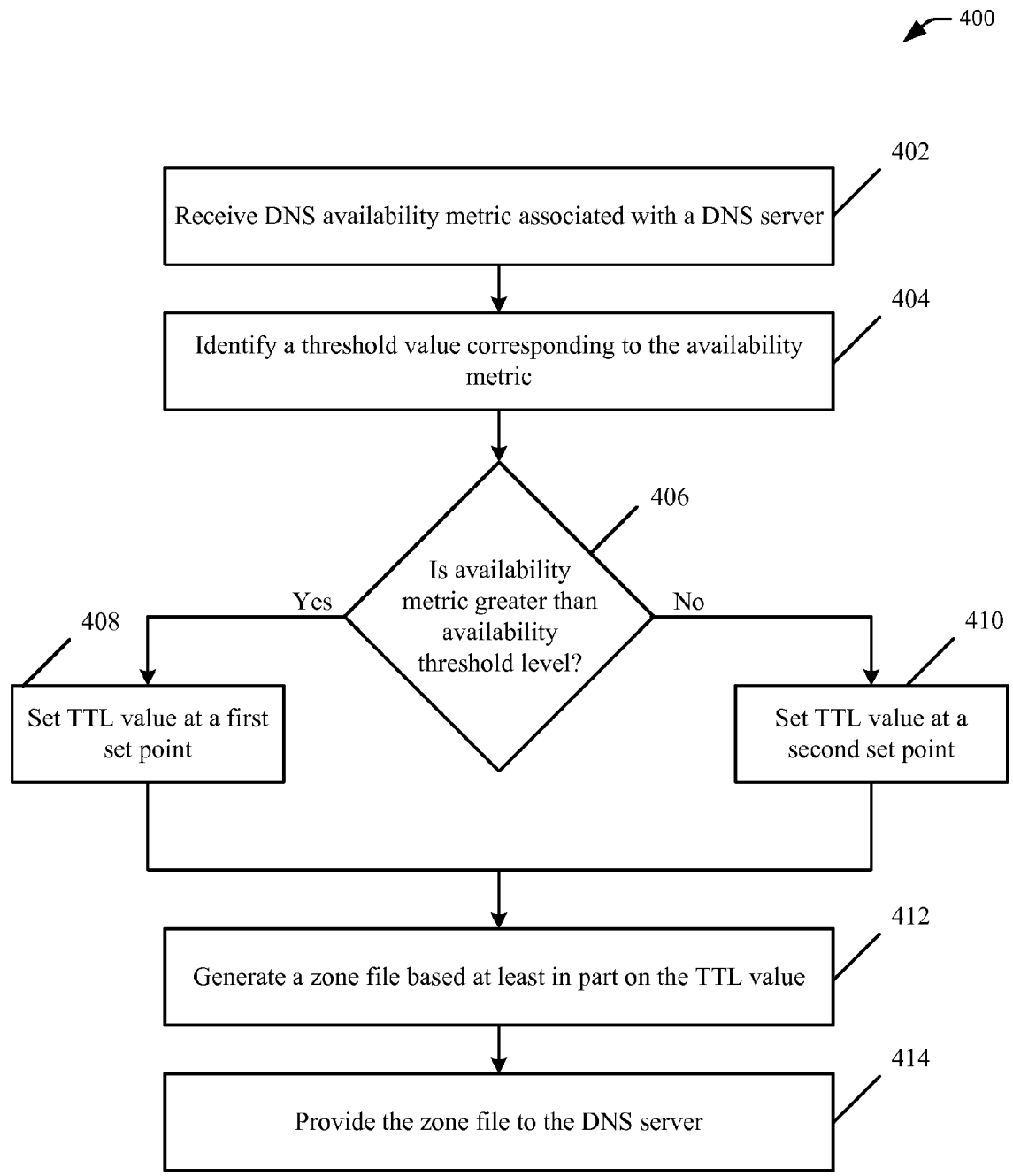
FIG. 4 illustrates a flow diagram representing an example method for generating and transmitting a zone file for controlling risk aware domain name service based on a domain name service availability metric, in accordance with embodiments of the disclosure.

Referring now to FIG. 4, an example method 400 for providing a zone file to a DNS server based at least in part on an availability metric is illustrated. The method 400 may be implemented by the DNS management servers 150 and may be a particular implementation of the example method 300 for providing a zone file to a DNS server 140. As with method 300 of FIG. 3, method 400 may alternatively be performed by the DNS server 140 in certain embodiments of the disclosure. At block 402, availability metric data associated with a DNS server may be received. This availability metric may be a percentage of DNS requests that are being fulfilled within a particular period of time. For example, the availability metric may indicate the percentage of DNS requests that are fulfilled with about 1 second of receiving the DNS request. This metric data may be received by the DNS management servers 150 directly from the DNS servers or may be collected and/or measured by the DNS management servers 150.

At block 404, a threshold value corresponding to the received availability metric may be identified. This threshold value may be a fixed predetermined value provided to the DNS management servers 150. Alternatively, the threshold value may be determined by the DNS management servers 150 or provided to the DNS management servers 150 from a third party.

At block 406, it may be determined if the availability metric is greater than the threshold level. If the availability metric is greater than the threshold level, then, at block 408, a TTL value may be set at a first set point. If however, the availability metric is not greater than the threshold level, then, at block 410, the TTL value may be set at a second set point. The second set point of the TTL may be a value that is greater than the first set point. Indeed, a greater availability metric may indicate a lesser risk of DNS resolution failure and may, therefore, warrant a smaller TTL value. Similarly, a lower availability metric value may indicate a higher risk of DNS resolution failure and may, therefore, warrant a larger TTL value. As discussed above, a relatively larger TTL value may result in a relatively reduced DNS request load on a particular DNS server 140. Conversely, a relatively smaller TTL value may result in a relatively increased DNS request load on a particular DNS server 140. Accordingly, the DNS load request on a particular DNS server 140 may be modulated based on controlling the TTL value associated with the DNS server 140 and/or a particular domain name resolution. Indeed, the TTL value may be modulated at blocks 406, 408, and 410 responsive to an indication of risk of DNS failure of the DNS server 140.

Once the TTL value has been identified, at block 412, the zone file may be generated based at least in part on the determined TTL value. As described above, the zone file may indicate associations between one or more domain names and domain addresses, such as an IP address or DNS resource record type. The zone file may further indicate the TTL value selected at blocks 408 and 410. [?] At block 414, the zone file may be provided to the DNS server 140. In one aspect, one or more data packets of the zone file may be transmitted via the network 108 from the DNS management servers 150 to the DNS servers 140.

Figure 5:
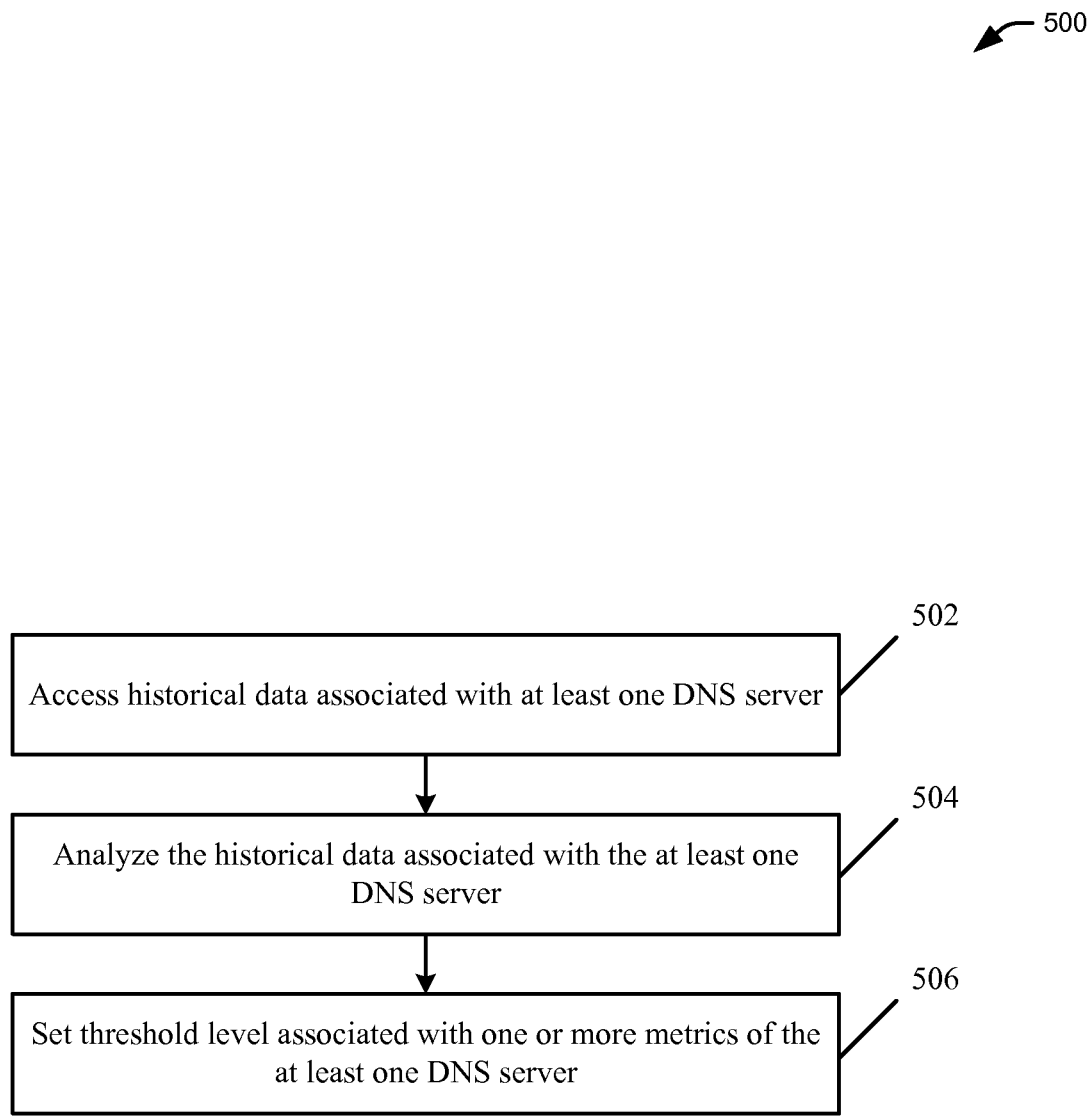
FIG. 5 illustrates a flow diagram representing an example method for setting a threshold level associated with a particular domain name server to execute risk aware domain name service, in accordance with embodiments of the disclosure.

Referring now to FIG. 5, an example method 500 for identifying threshold values associated with a particular DNS metric is illustrated. The method 500 may be performed by the DNS management servers 150. In certain embodiments, the method 500 may be performed by the DNS server 140 or a combination of the DNS server 140 and the DNS management server 150. At block 502, historical data associated with at least one DNS server may be accessed. This historical data may be accessed by the processors 160 of the DNS management servers 150 from the DNS database 180. Alternatively, this data may be received by the DNS management servers 150 from another entity, such as a remote database. In one aspect, the historical data may include a time series of one or more DNS metrics associated with a corresponding DNS server 140. For example, DNS latency data and DNS availability data over about a two-month time frame may be accessed by the DNS management servers 150. Additionally, the historical data may include indications of DNS failure, and these indications of DNS failure may include indications of time and severity of the failures. These failure events may be one or more of a DNS server 140 ceasing to provide DNS for a period of time or the DNS server 140 providing DNS resolution of incoming DNS requests under a predetermined threshold percentage. Indeed, a DNS failure event may indicate a relatively high failure of DNS resolution. Such a failure event may result in a relatively high percentage of users 102 not being able to access websites 116 that they desire to view on their user devices 104.

At block 504, the historical data associated with the at least one DNS server may be analyzed. In one aspect, the analysis may entail levels of various DNS metrics leading up to DNS failure events. These levels of the DNS metrics may provide guidance with respect to where to set threshold levels that may indicate a relatively high probability of future DNS failure events. Furthermore, the analysis at block 504 may indicate instances when the one or more DNS servers 140 may have been subject to malicious activities, such as a denial of service attack, where the DNS server 140 may have been inundated with DNS requests to cause a DNS failure event. At block 506, the analysis performed at block 504 may be used to identify threshold levels associated with the one or more metrics associated with the at least one DNS server 140.

It should be noted that in certain embodiments, the threshold levels may be set at the DNS servers 140 and the determination of the TTL levels may be performed at the DNS management servers 150. In other embodiments, the threshold levels may be set at the DNS management servers 150 and the determination of the TTL levels may be performed at the DNS servers 140.

It should be noted that the method 500 may be modified in various ways in accordance with certain embodiments of the disclosure. For example, one or more operations of the method 500 may be eliminated or executed out of order in other embodiments of the disclosure. Additionally, other operations may be added to the method 500 in accordance with other embodiments of the disclosure.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system, comprising:
   at least one memory that stores computer-executable instructions;
   at least one processor configured to access the at least one memory, wherein the at least one processor is configured to execute the computer-executable instructions to:
   receive a domain name service (DNS) availability metric associated with a DNS server;
   identify a threshold value corresponding to the received DNS availability metric, wherein the DNS availability metric is indicative of at least one of: (i) DNS server availability; (ii) percentage of DNS resolution failure; (iii) DNS resolution latency; (iv) number of DNS requests received; (v) DNS server processor usage; (vi) DNS server resources; or (vii) network availability;

determine a time to live (TTL) value based at least in part on comparing the DNS availability metric to the corresponding threshold value, wherein the TTL value indicates an amount of time that a user device is to store results of a DNS resolution;

generate a zone file based at least in part on the determined TTL value; and transmit the zone file to the DNS server.

2. The system of claim 1, wherein receiving the DNS availability metric comprises at least one of: (i) receiving the DNS availability metric from the DNS server; (ii) polling the DNS server for the DNS availability data; or (iii) measuring the DNS availability data.

3. The system of claim 1, wherein the threshold value is based at least in part on historical DNS availability metric data associated with one or more DNS servers.

4. The system of claim 1, wherein the threshold value is based at least in part on information about one or more DNS failure events.

5. The system of claim 1, wherein determining the TTL value further comprises setting the TTL value to a first set point if the DNS availability metric is greater than the corresponding threshold value and setting the TTL value to a second set point if the DNS availability metric is less than the corresponding threshold value.

6. The system of claim 5, wherein the first set point value is less than the second set point value.

7. The system of claim 1, wherein the zone file further comprises an association of a domain name to an internet protocol (IP) address or DNS resource record type.

8. A method, comprising:

receiving, by a domain name service (DNS) server comprising at least one processor, a zone file including at least an indication of a time to live (TTL) value, wherein the TTL value indicates an amount of time that a user device is to store results of a DNS resolution;

receiving, by the DNS server, a DNS request from a user device;

creating, by the DNS server, a DNS response comprising domain name resolution and the TTL value based at least in part on the zone file and the DNS request; and transmitting, by the DNS server, the DNS response to the user device, wherein the TTL value is based at least in part on one or more DNS metrics associated with the DNS server, and wherein the one or more DNS metrics comprises at least one of: (i) DNS server availability; (ii) percentage of DNS resolution failure; (iii) DNS resolution latency; (iv) number of DNS requests received; (v) DNS server processor usage; (vi) DNS server resources; or (vii) network availability.

9. The method of claim 8, wherein the zone file further comprises an association between a domain name and an internet protocol (IP) address or DNS resource record type.

10. The method of claim 8, wherein the DNS request comprises at least an indication of a domain name.

11. The method of claim 10, wherein the domain resolution comprises associating an IP address or DNS resource record type to the indication of the domain name.

12. The method of claim 8, wherein the DNS request comprises an IP address associated with the user device or a caching DNS server.

13. The method of claim 8, wherein the TTL value is further based at least in part on one or more threshold values corresponding to the DNS metrics.

14. At least one non-transitory computer-readable medium comprising computer-executable instructions that, when executed by one or more processors, execute a method comprising:

receiving one or more domain name service (DNS) metrics associated with a DNS server;

identifying respective threshold values corresponding to the received one or more DNS metrics;

determining a time to live (TTL) value based at least in part on comparing the one or more DNS metrics to the respective corresponding threshold values, wherein the one or more DNS metrics comprises at least one of: (i) DNS server availability; (ii) percentage of DNS resolution failure; (iii) DNS resolution latency; (iv) number of DNS requests received; (v) DNS server processor usage; (vi) DNS server resources; or (vii) network availability; and transmitting an indication of the TTL value.

15. The at least one non-transitory computer-readable medium of claim 14, wherein transmitting an indication of the TTL value comprises generating a zone file based at least in part on the determined TTL value.

16. The at least one non-transitory computer-readable medium of claim 15, wherein the zone file further comprises an association of a domain name to an internet protocol (IP) address or DNS resource record type.

17. The at least one non-transitory computer-readable medium of claim 14, wherein the threshold values corresponding to the one or more DNS metrics are based at least in part on historical DNS metric data associated with one or more DNS servers.

18. The at least one non-transitory computer-readable medium of claim 14, wherein the threshold values corresponding to the one or more DNS metrics are based at least in part on information about one or more DNS failure events.

19. The at least one non-transitory computer-readable medium of claim 14, wherein determining the TTL value further comprises setting the TTL value to one of either: (i) a first set point if at least one of the one or more DNS metrics is greater than its corresponding respective threshold value; or (ii) a second set point if the one or more DNS metrics are less than their corresponding respective threshold value.

20. The at least one non-transitory computer-readable medium of claim 19, wherein the one or more DNS metrics are a DNS latency and the first set point value is greater than the second set point value.

* * * * *